(12) United States Patent
Lettkeman et al.

(10) Patent No.: US 9,944,556 B2
(45) Date of Patent: Apr. 17, 2018

(54) COMPOSITIONS WITH SYNTHETIC GYPSUM AND METHODS

(71) Applicant: United States Gypsum Company, Chicago, IL (US)

(72) Inventors: Dennis Mark Lettkeman, Watonga, OK (US); John Wesley Wilson, Fairview, OK (US); Mike L. Cloud, Canton, OK (US); Brian K. Ball, Fort Dodge, IA (US); Raymond A. Kaligian, Geneva, IL (US); Doug Blackburn, Port Clinton, OH (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 80 days.

(21) Appl. No.: 14/514,961

(22) Filed: Oct. 15, 2014

(65) Prior Publication Data
US 2016/0107931 A1 Apr. 21, 2016

(51) Int. Cl.
| | |
|---|---|
| C04B 11/00 | (2006.01) |
| C04B 11/26 | (2006.01) |
| C04B 7/04 | (2006.01) |
| C04B 18/04 | (2006.01) |
| C04B 20/10 | (2006.01) |
| C04B 20/12 | (2006.01) |
| C04B 28/14 | (2006.01) |
| C04B 103/00 | (2006.01) |
| C04B 111/80 | (2006.01) |

(52) U.S. Cl.
CPC ............. *C04B 11/00* (2013.01); *C04B 7/04* (2013.01); *C04B 20/1018* (2013.01); *C04B 20/12* (2013.01); *C04B 28/142* (2013.01); *C04B 2103/0031* (2013.01); *C04B 2111/802* (2013.01); *Y02W 30/92* (2015.05); *Y02W 30/94* (2015.05)

(58) Field of Classification Search
CPC ... C04B 11/00; C04B 18/0445; C04B 11/264; C04B 7/04; C04B 20/1018; C04B 20/12; C04B 28/142; C04B 2103/0031; C04B 2111/802
USPC ......................................... 106/708, 715, 778
See application file for complete search history.

(56) References Cited

U.S. PATENT DOCUMENTS

| | | |
|---|---|---|
| 4,533,528 A | 8/1985 | Zaskalicky |
| 4,661,161 A | 4/1987 | Jakacki et al. |

(Continued)

OTHER PUBLICATIONS

Kogel, Jessica Elzea; Trivedi, Nikhil C.; Barker, James M.; Krukowski, Stanley T. "Industrial Minerals & Rocks: Commodities, Markets, and Uses". Society for Mining, Metallurgy, and Exploration, Inc. pp. 1145. 2006.*

(Continued)

*Primary Examiner* — Helene Klemanski
(74) *Attorney, Agent, or Firm* — Greer, Burns & Crain, Ltd.; Brian Wishnow; Philip T. Petti

(57) ABSTRACT

DTPA-coated synthetic calcined gypsum is provided with alpha-like properties and obtained by spray-coating the synthetic caclined gypsum with DTPA. Cementitious compositions comprising DTPA-coated synthetic calcined gypsum and low water demand are provided as well. Methods for controlling an open time of a cementitious slurry by increasing or decreasing the amount of DTPA-coated synthetic calcined gypsum in the slurry are provided as well.

7 Claims, 4 Drawing Sheets

(56) References Cited

U.S. PATENT DOCUMENTS 8,343,273 B1 1/2013 Lettkeman et al.
2009/0011207 A1* 1/2009 Dubey ............... C04B 20/1051
428/219

OTHER PUBLICATIONS

"What is Gypsum". Eurohypsum. Jul. 16, 2007. Retrieved from http://www.eurogypsum.org/wp-content/uploads/2015/04/whatisgypsum.pdf.*

"Gypsum Based Building Materials". APITCO. Retrieved from http://apitco.org/profiles/gypsum%20based%20building%20materials.pdf.*

* cited by examiner

COMPOSITIONS WITH SYNTHETIC GYPSUM AND METHODS

FIELD OF THE INVENTION

This invention relates to compositions with modified synthetic gypsum and methods for regulating water demand, decreasing the use of plasticizers and for controlling setting and rheology characteristics of a gypsum slurry.

BACKGROUND

Natural gypsum is also known as calcium sulfate dihydrate, terra alba or landplaster. Calcined gypsum is obtained by removing part of the water associated with the gypsum crystal. Synonymous terms for calcined gypsum are Plaster of Paris, stucco, calcium sulfate half-hydrate and calcium sulfate hemihydrate. Calcined gypsum, stucco and hemihydrate are the most commonly used terms, and they are used interchangeably in this application. When gypsum is mined, the natural rock is found in the dihydrate form, having about two water molecules associated with each molecule of calcium sulfate. In order to produce the stucco form, the gypsum can be calcined to drive off some of the water of hydration represented by the following equation:

$$CaSO_4 \cdot 2H_2O \rightarrow CaSO_4 \cdot 1/2H_2O + 3/2H_2O$$

Calcium sulfate hemihydrate is obtained by calcination to remove the associated water molecules. The hemihydrate is produced in at least two crystal forms. Alpha-calcined gypsum is made by a slurry process or a lump rock process whereby the calcium sulfate dihydrate is calcined under pressure. The alpha-calcined gypsum forms less acicular crystals than beta-calcined gypsum, allowing the crystals to pack tightly together, making a denser and stronger plaster. The crystal morphology of alpha hemihydrate allows water to flow easily between the crystals, requiring less water to form a flowable slurry. More elongated irregular shaped crystals are characteristic of the beta-hemihydrate, which is obtained by calcining gypsum at atmospheric pressure. This crystal structure results in a less dense product because the crystals are more loosely packed. The beta form also requires more water to fluidize the calcined gypsum. If the calcining of the dihydrate is performed at ambient pressure, the beta form is obtained and the cost is relatively low compared to the alpha-calcined gypsum.

A number of useful gypsum products can be made by mixing calcined gypsum with water and shaping the resulting gypsum slurry into a desired shape. The gypsum slurry is permitted to set by allowing calcium sulfate hemihydrate to react with sufficient water to convert the hemihydrate into a matrix of interlocking dihydrate crystals. As the matrix forms, the gypsum slurry becomes firm and holds the desired shape. Excess water must then be removed from the product by drying.

Set accelerators and set retarders (collectively known as "set modifiers") are used in gypsum product compositions to control the set time of the gypsum product. If the set time is too long, contractors spend time waiting for the composition to set before they can move on to the next step of the project. When gypsum sets too quickly, the composition hardens before it is properly finished. In such cases, the surface may not be as smooth as desired or the product may not have been "worked" enough to produce a good finish.

Dry mixtures of calcium sulfate hemihydrate with additives can be pre-blended and produced. The dry mixtures are designed to be mixed with water to produce a high quality composition that is easy to use. One example of a setting mixture is one that produces a flooring slurry when combined with water, such as LEVELROCK® gypsum flooring material.

Set accelerators are utilized to hasten setting of the gypsum slurry. Retarders are added to setting mixtures to increase the working time of the gypsum slurry. The working time, also known as the open time, is the time that the slurry is pliable and can be shaped into a desired configuration.

Conventionally, proteinaceous retarders, such as SUMA retarder, and non-proteinaceous retarders, such as cream of tartar (potassium bitartrate), sodium citrate and diethylene-triamine-pentacetic acid and/or other organic chemicals/compounds known in the art, are utilized. The SUMA retarder, commercially available as a dry powder additive, has disadvantages associated with its use. For example, SUMA has a strong and offensive odor. It is proteinaceous, and sourced from hair and hooves of various animals, such as horses. SUMA also has undesirable aging characteristics. There is a long-standing need in the industry for a suitable replacement for this dry set retarder.

Diethylene-triamine-pentaacetic acid (DTPA) is also known as a set retarder, but the dry powdered forms have been found to be ineffective. For example, U.S. Pat. No. 4,661,161 to Jacacki ("Jacacki") teaches the addition of a liquid form of diethylenetriamine pentaacetic acid ("DTPA"). U.S. Pat. No. 8,343,273 to Lettkeman et al., the entire disclose of which is incorporated herein by reference in its entirety, provides methods for utilizing DTPA as set retarder in compositions with beta stucco from calcined natural rock gypsum.

Dry powdered versions of various salts of DTPA have been found to have little or no effect on the reduction of water demand of calcined gypsums. Furthermore, the impact of dry versions of chelating agents have little effect on the setting action of calcined gypsums. Conventionally, various plasticizers such as naphthalene sulfonate and polycarboxylic acid, but not limited to the same, are used to decrease the amount of water (water demand) needed for preparing a workable gypsum slurry.

Synthetic gypsum, which is a byproduct of flue gas desulfurization processes from power plants, is also useful. Flue gas that includes sulfur dioxide is wet scrubbed with lime or limestone. Calcium from the lime combines with the sulfur dioxide to form calcium sulfite.

$$CaCO_3 + SO_2 \rightarrow CaSO_3 + CO_2$$

Via forced oxidation, the calcium sulfite is converted to calcium sulfate.

$$CaSO_3 + 2H_2O + \frac{1}{2}O_2 \rightarrow CaSO_4 \cdot 2H_2O$$

Synthetic gypsum is converted into calcium hemihydrate by calcination. While there are advantages to using synthetic calcined gypsum because this significantly decreases the environmental footprint, adding synthetic calcined gypsum usually increases water demand and more water is needed to prepare a workable gypsum slurry. Increasing the water demand is not desirable because this may affect unfavorably the strength of a gypsum product and may also increase the time and energy needed for evaporating the excess of water from the gypsum product.

SUMMARY

This invention provides synthetic calcined gypsum coated with diethylene-triamine-pentaacetic acid (DTPA). The DTPA-coated synthetic calcined gypsum is obtained by spray-coating the synthetic calcined gypsum with DTPA in a fluidized bed chamber at a temperature in the range from 190 degrees Fahrenheit to 340 degrees Fahrenheit. The DTPA-coated synthetic calcined gypsum is comparable in its properties to natural alpha calcined gypsum. These alpha-like properties of the DTPA-coated synthetic calcined gypsum are unexpected because synthetic calcined gypsum does not have these properties.

At least in some embodiments, the DTPA-coated synthetic calcined gypsum has a setting time from 150 to 300 minutes. In some embodiments, the DTPA-coated synthetic calcined gypsum is obtained by spray coating the synthetic calcined gypsum with DTPA in a fluidized bed chamber at a temperature in the range from 212 degrees Fahrenheit to 300 degrees Fahrenheit. In some embodiments, DTPA is used at 0.1 to 1.0 lbs/min for spray coating of the synthetic calcined gypsum in the fluidized bed chamber.

In some embodiments, the synthetic calcined gypsum coated with DTPA of claim 1 is obtained without drying the DTPA-coated calcined gypsum after it exits from the fluidized bed chamber.

In some embodiments, spray coating with DTPA is performed at the dosage rate for DTPA in the range of 0.1 to 40 lb/min of the DTPA liquid onto the synthetic calcined gypsum with a flow rate of synthetic calcined gypsum of approximately 9-11 tons/hour.

In addition to DTPA, the synthetic calcined gypsum can be further s pray coated with at least one of the following second compounds: tartaric acid, citric acid, proteinaceous retarder, sodium citrate, cream of tartar, Rochelle salts, PlastRetard™ L proteinaceous retarder available from Sicit 2000), SUMA retarder, Climatic Stable Accelerator (CSA®), Heat Resistant Accelerator (HRA®), TERRA ALBA® gypsum accelerator, aluminum sulfate, zinc sulfate, potassium sulfate and any combination thereof.

Further embodiments provide a cementitious composition comprising DTPA-coated synthetic calcined gypsum and at least one natural calcined gypsum. Such compositions have very low water demand which is no more than 50 cc for 100 parts of all stucco combined. Various natural gypsums can be used in the compositions, including alpha calcined gypsum, low consistency alpha calcined gypsum and beta calcined gypsum. At least in some embodiments, the natural calcined gypsum is also spray-coated with DTPA. In some cementitious compositions, DTPA-coated synthetic calcined gypsum comprises from 0.1% to 25% of all gypsum in the composition, based on the dry weight. The cementitious compositions have a very low water demand, yet at least some of the compositions can be prepared without a plasticizer.

In further embodiments, the composition can comprise at least one cement. In further embodiments, the composition can comprise at least one pozzolan which can be added in addition to cement or instead of the cement.

Other embodiments provide methods in which a cementitious slurry is prepared with the DTPA-coated synthetic calcined gypsum and the open time of the slurry is controlled by increasing the amount of DTPA-coated synthetic calcined gypsum in the slurry from 0% to a value in the range from 0.1% to 25% such that increasing the amount of the DTPA-coated synthetic calcined gypsum in the slurry increases the open time. At least in some embodiments, the only retarder used in the cementitious slurry is DTPA-coated synthetic calcined gypsum.

DETAILED DESCRIPTION

The invention provides improved formulations with DTPA spray-coated synthetic calcined gypsum. These formulations are particularly useful for preparing various cementitious blends with various natural gypsums, including alpha calcined gypsum, beta calcined gypsum and low consistency alpha calcined gypsum. The formulations and blends have a surprisingly low water demand such that the use of a plasticizer may be either reduced or completely avoided. Further, DTPA spray-coated synthetic calcined gypsum serves as a retarder and increases significantly the working time for blends with natural alpha calcined gypsum and beta calcined gypsum without increasing the water demand for the blends.

The inventors have developed a modified formulation with synthetic calcined gypsum in which synthetic calcined gypsum is spray-coated with diethylenetriamine-pentaacetic acid (DTPA). No additional drying is required after the step of spay-coating is completed. At least in some embodiments, the spray coating takes place in a fluidized bed stucco treatment chamber, one embodiment of which is shown in FIG. 1.

Figure 1:
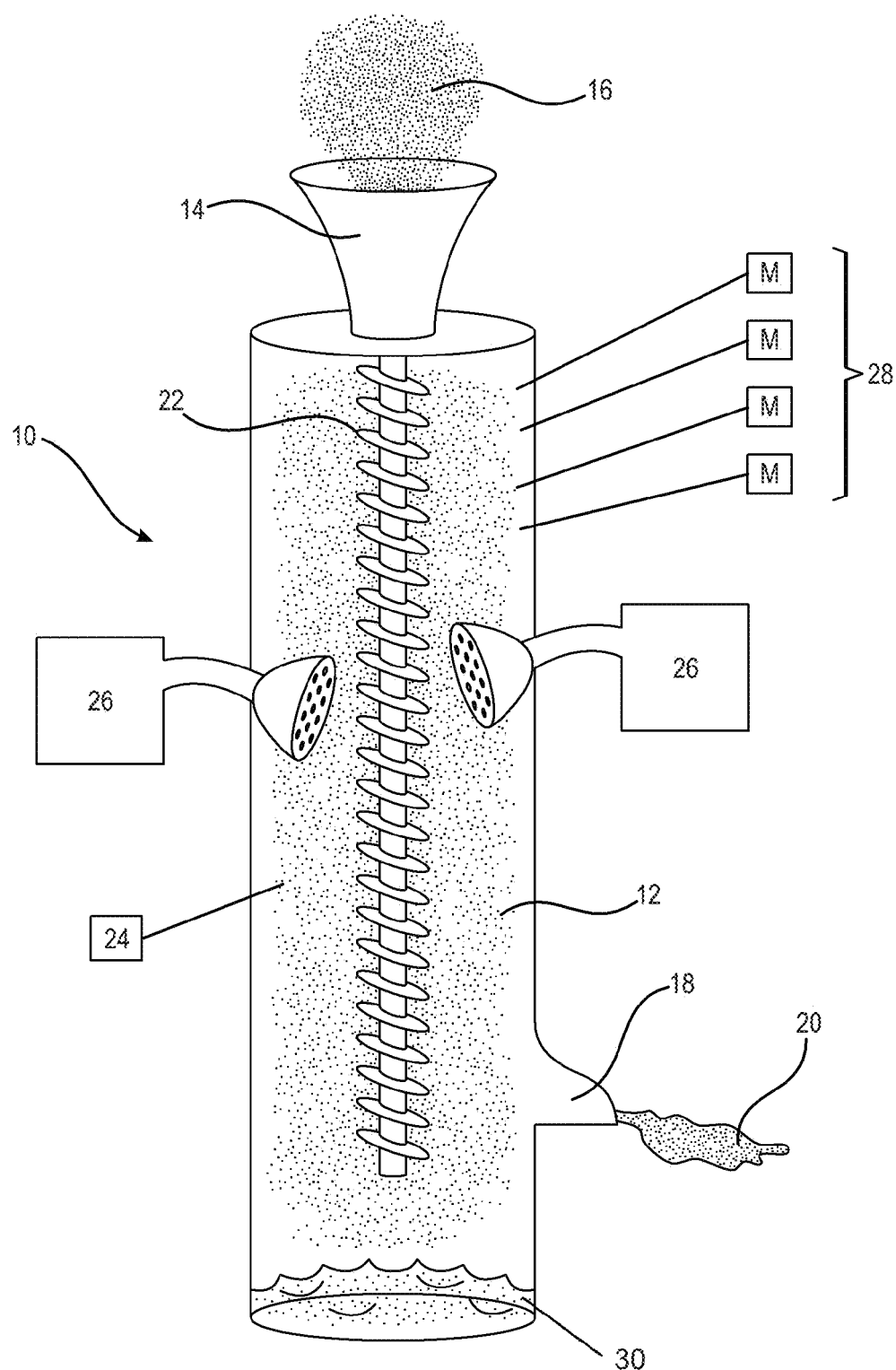
FIG. 1 is a schematic of one embodiment for a treatment vessel in which synthetic calcined gypsum is spray-coated with DTPA.

Referring to FIG. 1, a treatment vessel, generally 10, comprises a fluidized bed stucco treatment chamber 12 with an entrance port 14 through which the synthetic calcined gypsum 16 enters and an exit port 18 from which the spray coated synthetic calcined gypsum 20 is collected. As shown in FIG. 1, the treatment chamber 12 can be situated vertically or in other embodiments, it can be horizontal.

The treatment vessel 10 may be equipped with at least one means for controlling the speed at which the synthetic gypsum particles traverse the treatment chamber 12. Suitable means include, but are not limited to, an agitator 22 and an air chamber 24 which creates a pressure differential in a direction from the entrance port 14 to the exit port 18. The treatment vessel 10 is further equipped with at least one atomizer/sprayer 26 which sprays/atomizes the synthetic gypsum particles 16 with DTPA. The treatment vessel 10 can be further equipped with at least one means for controlling humidity in the treatment chamber 12. Such means may include, but are not limited, to a fluidized bed 30.

The treatment chamber 12 may be further equipped with at least one and sometimes with several means 28 for measuring and monitoring at least one of the following: temperature, humidity and pressure in the treatment chamber 12 and a speed at which the synthetic gypsum particles 16 traverse the treatment chamber 12.

One of the advantages of this method for spray coating synthetic gypsum is that there is no need to dry the coated synthetic gypsum particles 20 after the treatment in the chamber 12. The coated synthetic gypsum particles 20 can be packaged right after the exit from the treatment chamber 12.

It has been also unexpectedly discovered that DTPA can be used at a low level and as little as from 0.1 to 1.0 lbs/min of DTPA is sufficient to spray coat synthetic calcined gypsum. Thus, the adhesion of DTPA to synthetic calcined gypsum is significantly better than that obtained for natural calcined gypsum. Further, the DTPA coated synthetic calcined gypsum increases significantly the open time (time before a gypsum slurry sets).

Liquid DTPA may be sprayed on synthetic calcined gypsum at a wide range of addition rates which are beneficial. At low levels, such as, but not limited to, 0.1-1.0 lbs/min, it is advantageous to dilute the DTPA solution with water. This achieves a more uniform distribution of DTPA on the surfaces of the synthetic calcined gypsum. In other embodiments, DTPA can be used in the amount from 0.1 to 40 lbs/min. When used at the rates of above 10 lbs/minute, DTPA can be used undiluted. The process of spray-coating with DTPA can be performed at temperatures between 190 and 340 degrees Fahrenheit. At least in some embodiments, the spray coating takes place at a temperature selected from the range from 212 to 300 degrees Fahrenheit.

The rate of flow of synthetic calcined gypsum into a chamber in which it is spray-coated with DTPA can also be controlled. In some embodiments, from 1 to 20 tons per hour of synthetic calcined gypsum can be coated with DTPA.

Any source of DTPA can be used for obtaining the DTPA-coated synthetic calcined gypsum as described above. For example, suitable sources for DTPA include, but are not limited to, diethylenetriamine-pentaacetic acid ("DTPA") DTPA, such as NOGO™ Hydration Inhibitor (United States Gypsum Company, Chicago, Ill.) DTPA or VERSENEX 80® (UNIVAR, Oklahoma City, Okla.).

In further embodiments, other retarders can be also used either in combination with DTPA or separately for spray coating of synthetic calcined gypsum. These retarders include, but are not limited to, citric acid, tartaric acid, cream of tartar, Rochelle salts, Plast Retard L, proteinaceous retarder such as "SUMA" and sodium citrate.

In further embodiments, an accelerator can be used for spray coating of synthetic calcined gypsum. Suitable accelerators include, but not be limited to, Climate Stable Accelerator (CSA®), Heat Resistant Accelerator (HRA®), TERRA ALBA®, all forms of calcium sulfate dehydrate, aluminum sulfate, zinc sulfate, and potassium sulfate.

In some embodiments, an accelerator can be added to a DTPA solution. In other embodiments, an accelerator can be sprayed on synthetic calcined gypsum without DTPA. In further embodiments, an accelerator and DTPA can be sprayed in sequence such as, for example, an accelerator is sprayed first, and DTPA is then sprayed over synthetic calcined gypsum particles coated with the accelerator. Yet in other embodiments, synthetic calcined gypsum particles are spray coated with DTPA first, followed by spray coating with an accelerator or a retarder. These various spray coating schedules are useful to control and modify a setting action, working time, setting expansion, timed rheology changes and/or the compressive strength and hardness of a resulting gypsum product.

The inventors have unexpectedly discovered that DTPA-coated synthetic calcined gypsum provides an excellent open time which is much longer than an open time for natural beta calcium sulfate hemi-hydrate. As shown in Table 1 below, the DTPA-coated synthetic gypsum has a setting time in the range from 150 to 300 minutes, while similarly DTPA coated natural beta calcium sulfate hemi-hydrate exhibits set times in the range from 20 to 45 minutes. Importantly, when DTPA is used in higher concentrations, the slurry remains fluid for over one week. The slurry eventually dries out rather than becomes set through rehydration of synthetic beta calcium sulfate hemi-hydrate. It will be appreciated that spray coating synthetic beta calcium sulfate hemi-hydrate with DTPA retards its setting time in a pattern different from natural beta calcium sulfate hemi-hydrate.

TABLE 1

| Calcined Gypsum | Spray Coated With | Set Time |
| --- | --- | --- |
| Natural beta calcium sulfate hemi-hydrate | 0.25 to 0.5 lbs/min DTPA | 20-45 minutes |
| Synthetic beta calcium sulfate hemi-hydrate | 0.25 to 0.5 lbs/min DTPA | 150-300 minutes |
| Synthetic beta calcium sulfate hemi-hydrate | 11.37-22.74 lbs/min DTPA | 1 to 2 weeks (Note: (1)) (10,080-20,160) |

Note (1):
between 1 to 2 weeks the slurry dried out rather than reached typical hydrational vicat set.

Figure 2:
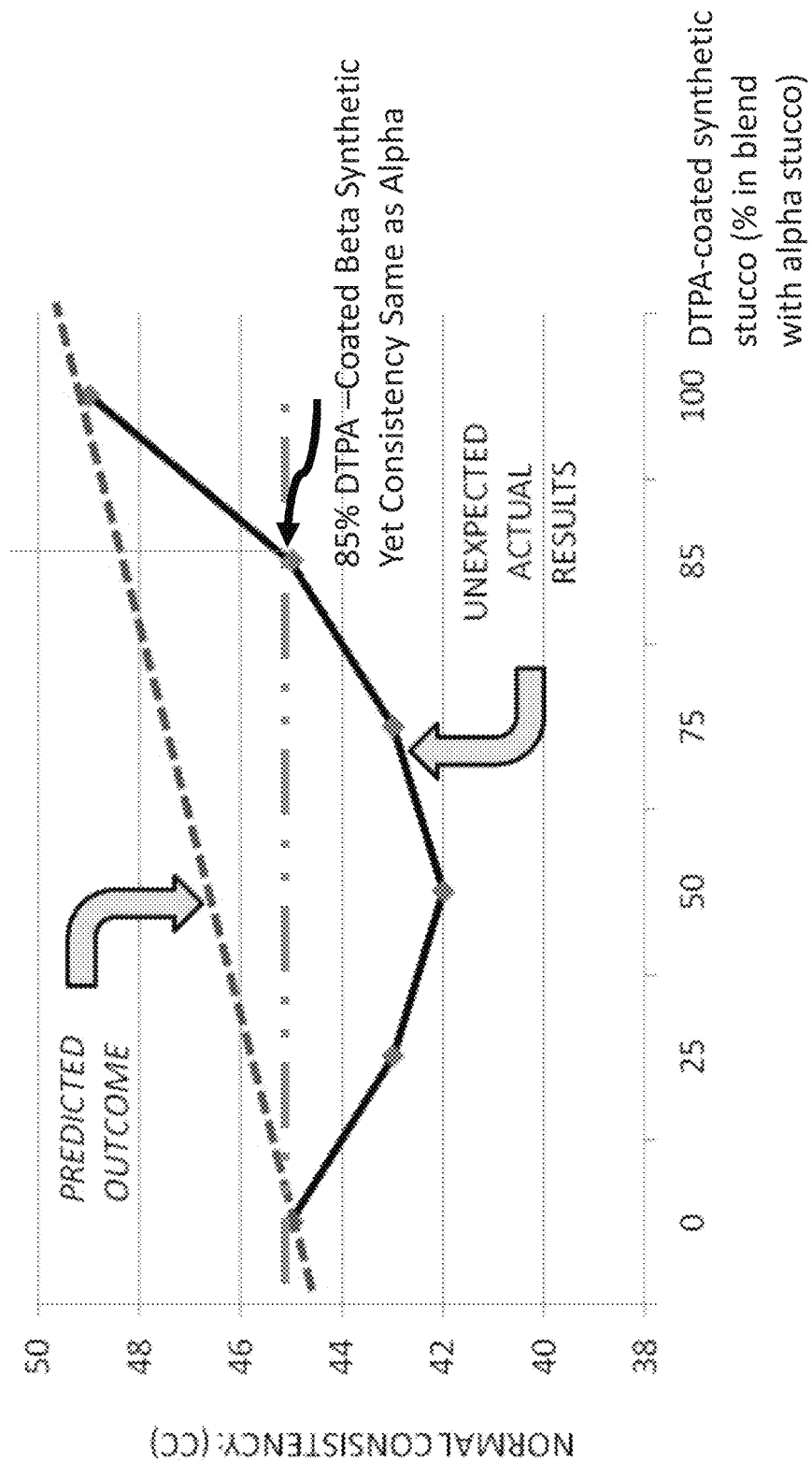
FIG. 2 is a graph reporting that the water demand in blends of alpha calcined gypsum with DTPA-coated synthetic beta calcined gypsum is significantly decreased.

Further and also unexpectedly, the DTPA-coated synthetic calcined gypsum has a significantly decreased water demand. FIG. 2 reports normal consistency data for blends with DTPA—coated synthetic beta calcined gypsum and natural alpha calcined gypsum. Dry mixtures were prepared with natural alpha calcium sulfate hemi-hydrate to which DTPA-coated synthetic stucco was added at various percentages, from 0% to 100%. The mixtures were then mixed with water and the amount of water needed to obtain a workable gypsum slurry, known as normal consistency, was recorded.

FIG. 2 reports normal consistency as function from the amount of DTPA-coated synthetic calcined gypsum added. Because synthetic gypsum is known to have a water demand higher than that of natural alpha calcium sulfate hemi-hydrate, increasing the amount of synthetic calcined gypsum in the blend should lead to an increase in the amount of water needed for obtaining a slurry with normal consistency.

However and as shown in FIG. 2, the water demand for blends comprising from 25% to 90% DTPA-coated synthetic calcined gypsum was unexpectedly decreased instead of increasing. These blends resulted in the water demand as low or even lower than natural alpha calcium sulfate hemi-hydrate used alone. Blends with 25% to 75% DTPA-coated synthetic calcined gypsum achieve the low water demand compared with the water demand for natural alpha calcined gypsum without the use of a plasticizer. Previously, a plasticizer was needed to lower the water demand in compositions with synthetic beta calcined gypsum. Blends with 85% DTPA-coated synthetic beta calcined gypsum have the same normal consistency as that reported for slurries with 100% alpha calcium sulfate hemi-hydrate.

An additional beneficial feature for using DTPA-coated synthetic calcined gypsum includes methods in which gypsum slurries can be prepared with an ultra-low water demand and without a plasticizer. It will be appreciated that an ultra-low water demand includes formulations in which from 30 to 60 cc of water is used for 100 parts of calcined gypsum. In some embodiments, workable formulations are prepared with DTPA spray-coated synthetic calcined gypsum without a plasticizer and with only from 30 to 50 cc of water for 100 parts of DTPA spray-coated synthetic calcined gypsum.

As shown in FIG. 2, the water demand for alpha calcium sulfate hemi-hydrate with pourable consistency is in the range of 38-59 cc per 100 parts of calcined gypsum. As can be appreciated from FIG. 2, the DTPA-coated synthetic calcined gypsum achieves a similar consistency. Even more importantly, this water demand is significantly lower than that achieved for natural beta calcium sulfate hemi-hydrate treated with DTPA, which is typically in the range from 60 to 70 cc per 100 parts of calcined gypsum, as reported in Table 2 below.

Further and also unexpectedly, the DTPA-coated synthetic calcined gypsum has a much longer hydration time, referred to as Vicat Set, in comparison to DTPA-coated natural beta calcium sulfate hemi-hydrate. As shown in Table 2 below, the Vicat for DTPA-coated natural beta calcined gypsum is in the range of 20 to 45 minutes, while the Vicat for DTPA-coated synthetic stucco is in the range of 150-300 minutes.

TABLE 2

| Calcined Gypsum | Normal Consistency (cc) | Vicat Set (hand mixed for 30 seconds) | Temp Rise (° F./min) |
|---|---|---|---|
| DTPA-coated natural beta calcium sulfate hemi-hydrate | 61-69 | About 20-45 | — |
| DTPA-coated synthetic calcined gypsum | 42-50 | About 150-300 | 4.53 |
| Synthetic calcined gypsum, not coated | 63 | About 10-20 (Note (2)) | 3.66 |

Note (2):
the comparisons of the DTPA-coated natural beta calcium sulfate hemi-hydrate and DTPA-coated synthetic calcined gypsum were made at approximately the same dosage rates of 0.25-0.50 lb/min of DTPA at a calcined gypsum feed rate of approximately 10 tons per hour.

The strength of a gypsum product is measured as compressive strength. At least two different measurements can be taken, one at the time when a gypsum product is still wet, known as the green compressive strength, and the other compressive strength measurement can be taken at the time when the gypsum product has fully dried.

The inventors have discovered that the green compressive strength of a gypsum product formulated with DTPA-coated synthetic calcined gypsum is over 2,000 psi when measured at 1 hour and over 5,000 psi for the dry gypsum product at a pourable consistency of 50 cc. As shown in Table 3, the compressive strength of DTPA-coated synthetic calcined gypsum is significantly improved in comparison to non-treated synthetic calcined gypsum. As also shown in Table 3 and surprisingly, the compressive strength of the DTPA-coated synthetic calcined gypsum is better than that of DTPA-coated natural beta calcined gypsum. Further, the compressive strength of the DTPA-coated synthetic calcined gypsum is comparable to that of natural alpha calcined gypsum.

TABLE 3

| Calcined Gypsum | Green Compressive Strength (psi) | Dry Compressive Strength (psi) |
|---|---|---|
| DTPA-coated natural beta calcium sulfate hemi-hydrate | 1226 | 3021.57 |
| DTPA-coated synthetic calcined gypsum | Over 2000 | 5000 |
| Synthetic calcined gypsum, not coated | 1342 | 3475 |
| Natural alpha calcium sulfate hemi-hydrate | 2000-3500 | 4000-7000 |

The rate of hydration can be measured by monitoring the rise in temperature over time as a gypsum slurry is setting. In general, if a gypsum slurry has a long setting time, the rate of hydration is generally slow, which may affect negatively the green compressive strength of a gypsum product and other parameters as well. As shown in Table 1, the DTPA-coated synthetic calcined gypsum has a long setting time. However and as shown in Table 2, the DTPA-coated synthetic calcined gypsum has a rapid hydration rate and the rise in temperature is within 2 degrees of the control, as shown in Table 2, which is unexpected and beneficial.

It will be appreciated by a person of skill that a set time can be decreased by using a mechanical mixer. However and even with the mechanical mixing, the set times for the DTPA-coated synthetic calcined gypsum are still longer that those for DTPA-coated natural calcined gypsum.

A gypsum slurry can be tested for stability and aging. This can be determined by comparing a 7 second dispersed consistency to the total dispersed consistency.

As shown in Table 4, the lower 7 second dispersed consistency and the lower total dispersed consistency for a slurry with the DTPA-coated synthetic calcined gypsum provide for lesser aging over time.

TABLE 4

| Calcined Gypsum | 7 sec consistency (cc) | Total dispersed consistency (cc) |
|---|---|---|
| DTPA-coated synthetic calcined gypsum | 60 | 70 |
| Synthetic calcined gypsum, not coated | 142.5 | 180 |

Figure 3:
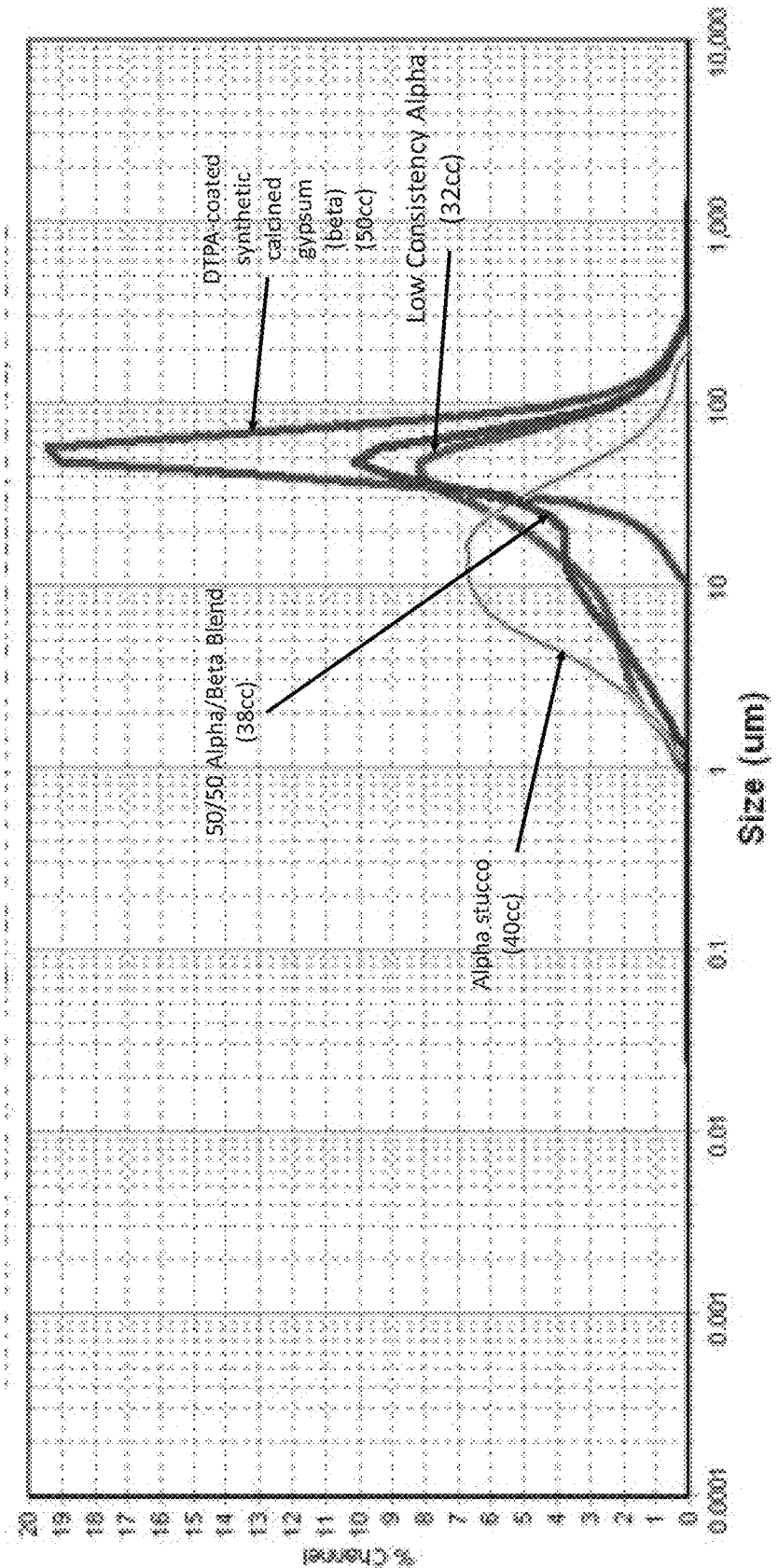
FIG. 3 is a graph showing a particle size distribution for the DTPA-coated synthetic gypsum.

It is generally expected that a population of dry gypsum particles would have a certain bell-curve size distribution. As shown in FIG. 3, the bell-curve distribution for alpha stucco is different from the bell curve distribution for low consistency alpha stucco in which particles are generally larger on average. As also shown in FIG. 3, blending a 50:50 mixture of natural alpha and beta calcined gypsum results in a shift of sizes and broader distribution in particle sizes.

However and unlike a blend of natural alpha and beta calcined gypsums, mixing DTPA-coated synthetic calcined gypsum with natural alpha calcined gypsum produces particles of a highly homogeneous size and comparable with low consistency natural alpha calcined gypsum. This feature is beneficial.

Further, spray coating with DTPA reduces only slightly the Fisher surface area ($cm^2/g$) and the total dispersed surface area of synthetic calcined gypsum particles. The Fisher surface area for synthetic calcined gypsum is in the range of 1772 $cm^2/g$, while that for the DTPA-treated synthetic calcined gypsum is in the range of 1544 $cm^2/g$. This is a dry compacted average particle size of the powders as measured with the FISHER subsieve sizer. The total dispersed surface area ($cm^2/g$) for the control synthetic calcined gypsum is 5088 $cm^2/g$ while the DTPA-coated synthetic calcined gypsum is 4667 $cm^2/g$ respectively.

In general, synthetic calcined gypsum is known to have properties similar to those of natural beta calcined gypsum. The inventors have unexpectedly discovered that spray-coating of the synthetic calcined gypsum with DTPA affords the synthetic calcined gypsum alpha-like properties as shown in FIGS. 2 and 3. For these reasons, DTPA-coated calcined gypsum may be called PSEUDO-ALPHA™ synthetic stucco. It will be appreciated that significant production cost-savings can be achieved by producing DTPA-coated calcined gypsum and using it in place of natural alpha calcined gypsum which is much more expensive to manufacture.

Figure 4:
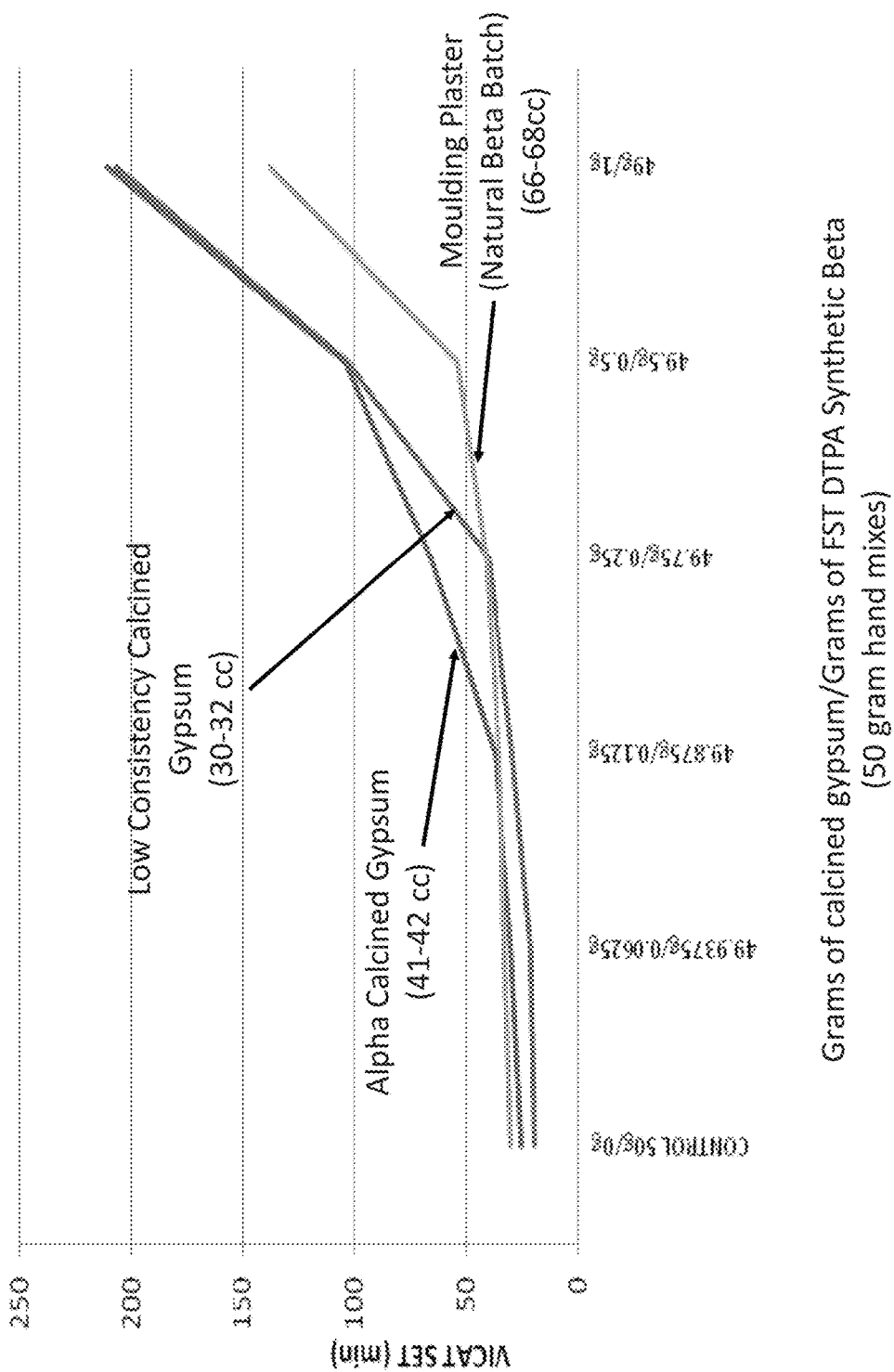
FIG. 4 is a graph showing that DTPA-coated synthetic calcined gypsum serves as an effective set retarder in blends with natural alpha calcined gypsum, natural beta calcined gypsum and natural low consistency alpha calcined gypsum.

Further embodiments provide that DTPA spray-coated synthetic calcined gypsum can act as an effective retarder for the purpose of extending the setting time, working time and overall rheology of a gypsum slurry. FIG. 4 reports setting times for various blends with DTPA spray-coated synthetic calcined gypsum and one of the following: natural alpha calcined gypsum, natural low consistency alpha calcined gypsum or natural beta calcined gypsum. As shown in FIG. 4, DTPA spray-coated synthetic calcined gypsum in the amount of as little as 2% of the total dry blend increases a setting time by at least 3 folds for each of the three natural calcined gypsums tested. Even more surprisingly, while the setting time is increased proportionally with the amount of DTPA spray-coated synthetic calcined gypsum added, the amount of water needed to achieve the normal consistency does not change. As shown in FIG. 4, the normal consistency water demand remains 30-32 cc for blends with natural low consistency alpha calcined gypsum, 66-68 cc for blends with natural beta calcined gypsum and 41-42 cc for blends with natural alpha calcined gypsum.

Further embodiments provide cementitious compositions comprising DTPA spray-coated synthetic gypsum as a retarder. Such compositions may comprises from 0.1% to about 10% of DTPA spray-coated synthetic gypsum, based on the dry weight of all cementitious components. At least in some embodiments, the compositions comprise from 0.1% to about 7.5% of DTPA spray-coated synthetic calcined gypsum, based on the dry weight of all cementitious components. At least in some embodiments, the compositions comprise from 0.1% to about 5% of DTPA spray-coated synthetic calcined gypsum, based on the dry weight of all cementitious components. At least in some embodiments, the compositions comprise from 0.1% to about 2.5% of DTPA spray-coated synthetic calcined gypsum, based on the dry weight of all cementitious components. At least in some embodiments, the compositions comprise from 0.1% to about 2.0% of DTPA spray-coated synthetic calcined gypsum, based on the dry weight of all cementitious components. These compositions may further comprise at least one of the following natural calcined gypsum: low consistency alpha calcined gypsum, alpha calcined gypsum, beta calcined gypsum and any combinations thereof. In some embodiments, no other retarder, but only DTPA spray-coated synthetic calcined gypsum is used in these compositions. At least in some embodiments, the ratio between DTPA spray-coated synthetic calcined gypsum and natural gypsums in the blend is from 0.1:50 to 1:50 of DTPA spray-coated synthetic calcined gypsum to a natural gypsum, based on dry weight.

In further embodiments, blends can be prepared in which DTPA spray-coated synthetic calcined gypsum is mixed with at least one natural gypsum which is also DTPA spray-coated. In some embodiments, natural alpha calcined gypsum is spray coated with DTPA in a fluidized bed chamber as provided in connection with a method for DTPA-spray coating of synthetic calcined gypsum and shown in FIG. 1.

DTPA spray-coated synthetic calcined gypsum is a more effective retarder than sodate or sodium citrate. In addition, DTPA spray-coated synthetic calcined gypsum may be a retarder of choice because it does not have an offensive odor of protein-based retarders, is very effective in delaying the setting time. Further, DTPA spray-coated synthetic calcined gypsum is more stable than protein-based retarders. Formulations with DTPA spray-coated synthetic calcined gypsum have a shelf-life longer than formulations with protein-based retarders.

Further embodiments provide cementitious compositions in which DTPA-coated synthetic calcined gypsum is blended with at least one of the following: natural alpha stucco, natural beta stucco, cement and other components such as binders, stabilizers and fillers. Such cementitious compositions can be used for preparing flooring, walls, wall panels and other products. The DTPA-coated synthetic calcined gypsum can be used with any of the following cements: white cement, gray PORTLAND cement types I, II, III, imp milled cement, class C cement but not limited to the same. The use of pozzolans such as but not limited to fly ash, silica fume and or slag cements is also expected to be useful in similar embodiments of the invention. In such compositions, the DTPA-coated synthetic calcined gypsum can be used in the amount from 0.1% to 50%, based on dry weight.

EXAMPLE 1

Twelve and one half pounds of DTPA liquid was added to a mixing tank where it was blended with enough water to reach a final volume of 50 gallons. The solution was mixed with a propeller type assembly.

The mixture was metered into an atomized treatment chamber at rates which provided addition rates of approximately 0.30 to 0.50 lbs/minute of DTPA. The atomized liquid has been efficiently sprayed onto synthetic calcined gypsum at temperatures between 190 to 340 degrees Fahrenheit, with preferred temperatures being within 212 to 300 degrees Fahrenheit. The preferred temperature ranges provide enough heat such that a dew point can be reached which provides the best treatment and such that a portion of the excess water can be "flashed" off and not have to be dried post treatment, or at least minimizing the need thereof. The rate of flow of synthetic calcined gypsum into the chamber where DTPA was applied was in the range of 9-11 tons per hour, but not limited to the same.

The range of DTPA addition varied from 0.3 lbs/minute to 22.74 lbs/minute. At the rates at or above 10 lbs/minute the liquid DTPA was not diluted, but was metered and atomized into the chamber at 100 percent concentration.

TABLE 5

Range of Useful Applications of Liquid DTPA

| DTPA (lbs/min) | DTPA (% addition rate) | DTPA (lbs/ton of gypsum) | Mix Design |
| --- | --- | --- | --- |
| 0.25 | 0.075 | 1.5 | 12.5 lbs liquid DTPA mixed with water to achieve 50 gallons |
| 0.50 | 0.150 | 3.0 | 12.5 lbs liquid DTPA mixed with water to achieve 50 gallons |
| 11.37 | 3.400 | 68 | DTPA liquid metered full concentration |
| 22.74 | 6.800 | 136 | DTPA liquid metered full concentration |

Based on the experimental design completed, levels in the range from 0.1-40 lbs/minute are considered to be useful.

While particular embodiments have been shown and described, it will be appreciated by those skilled in the art that changes and modifications may be made thereto without departing from the invention in its broader aspects and as set forth in the following claims.

What is claimed is:

1. A cementitious composition comprising DTPA-coated synthetic beta calcined gypsum, water and alpha calcined gypsum, and wherein the amount of water in the composition is no more than 50 cc for 100 parts of all gypsum combined; and wherein DTPA-coated synthetic beta calcined gypsum comprises from 25% to 85% of all gypsum combined in the composition, based on the dry weight.

2. The cementitious composition of claim 1, wherein the alpha calcined gypsum is spray coated with DTPA.

3. The cementitious composition of claim 1, wherein the DTPA-coated synthetic beta calcined gypsum comprises 25% of all gypsum in the composition, based on the dry weight.

4. The cementitious composition of claim 1, wherein the composition further comprises at least one type of cement.

5. The cementitious composition of claim 1, wherein the cement is selected from the group consisting of white cement, grey PORTLAND type cement, imp milled cement and class C cement.

6. The cementitious composition of claim 1, wherein the composition further comprises a compound selected from the group consisting of fly ash, slag cement and silica fume.

7. The cementitious composition of claim 5, wherein the composition further comprises a compound selected from the group consisting of fly ash, slag cement and silica fume.

* * * * *